(12) United States Patent
Holubar

(10) Patent No.: US 7,976,096 B2
(45) Date of Patent: Jul. 12, 2011

(54) AIR DRAG REDUCTION APPARATUS FOR TRACTOR-TRAILERS

(76) Inventor: Robert Holubar, Omaha, NE (US)

(*) Notice: Subject to any disclaimer, the term of this patent is extended or adjusted under 35 U.S.C. 154(b) by 203 days.

(21) Appl. No.: 12/355,236

(22) Filed: Jan. 16, 2009

(65) Prior Publication Data

US 2009/0179456 A1    Jul. 16, 2009

Related U.S. Application Data

(63) Continuation-in-part of application No. 11/827,721, filed on Jul. 13, 2007, now abandoned, which is a continuation-in-part of application No. 11/508,795, filed on Aug. 23, 2006, now abandoned.

(51) Int. Cl.
*B62D 35/00* (2006.01)

(52) U.S. Cl. .................... 296/180.1; 296/180.4

(58) Field of Classification Search ............... 296/180.4, 296/180.5, 180.1, 180.2, 180.3
See application file for complete search history.

(56) References Cited

U.S. PATENT DOCUMENTS

| | | | | |
|---|---|---|---|---|
| 6,485,087 B1 * | 11/2002 | Roberge et al. | ............ | 296/180.5 |
| 6,799,791 B2 * | 10/2004 | Reiman et al. | ............ | 296/180.1 |
| 7,431,381 B2 * | 10/2008 | Wood | ............ | 296/180.1 |

* cited by examiner

*Primary Examiner* — Glenn Dayoan
*Assistant Examiner* — Melissa A Black
(74) *Attorney, Agent, or Firm* — Stinson Morrison Hecker LLP

(57) ABSTRACT

An air drag reduction apparatus includes left and right panels and top and bottom panels for mounting to the rear doors of a tractor trailer along the top, bottom and side edges thereof. Hinges are interposed between the panels and the doors so that the panels can pivot about the hinges between an extended drag-reducing position and a collapsed position generally adjacent the rear doors. Stop devices releasably secure the panels in the extended position, and biasing devices such as tensioning springs are operative to bias the panels outwardly and rearwardly to the extended position and are further operative to permit the panels to pivot between the extended position towards and to the collapsed position upon impact and contact from an external object occurring and then return to the extended position substantially immediately upon contact ceasing thereby significantly reducing the impact damage. The apparatus also includes a ramp and wheel arrangement to facilitate opening and collapsing of the panels. The apparatus of the invention also includes an outwardly extending panel protection member projecting from the lower corner of the panel in a position for being contacted by external objects during movement of the vehicle to thereby prevent direct contact between an external object and the panel and cause the panel to move toward its collapsed position.

18 Claims, 16 Drawing Sheets

AIR DRAG REDUCTION APPARATUS FOR TRACTOR-TRAILERS

CROSS REFERENCE TO RELATED APPLICATION

This application is a continuation-in-part of U.S. patent application Ser. No. 11/827,721 filed on Jul. 13, 2007, which in turn is a continuation-in-part of U.S. patent application Ser. No. 11/508,795 filed on Aug. 23, 2006. Priority is claimed herein from each of said prior applications pursuant to 35 U.S.C. §120. Moreover, the entireties of the disclosures of said prior applications are hereby incorporated herein by reference.

BACKGROUND OF THE INVENTION

1. Field of the Invention

The present invention is directed to air drag reduction devices for vehicles and, more particularly, to air drag reduction apparatus for tractor-trailers which includes left, right and top panels, and in some cases lower, panels, which panels are mounted by hinges on the generally rectangular rear doors of the tractor-trailer and are swingable into an extended drag-reducing position where they are disposed at an inward angle of approximately five to twenty-five degrees from an essentially parallel alignment with the top, bottom and side walls of the tractor-trailer. The device further includes biasing devices such as springs mounted within or adjacent the hinges and which are operative to bias the panels toward and into their extended drag-reducing position and yet permit the panels to pivot between the extended position and a collapsed position where they lie in adjacent and contacting relationship relative to the rear trailer doors. The arrangement is such that if and when one or more of the panels might come into impacting relationship with an external object, such as a freight dock or another truck body, damage to the panels is significantly reduced as a result of the fact that the panels are collapsibly mounted on the rear doors.

2. The Prior Art Background

Operation of tractor-trailer units involves significant expenditures for maintenance and upkeep, but the single most costly element of operation is almost certainly the fuel costs required to operate the tractor-trailer. One of the operational features which most significantly increases the fuel consumption cost is that the tractor-trailer, as commonly used, has an extremely inefficient aerodynamic shape, since the size and shape of the tractor-trailer is generally dictated by the amount of cargo and size and shape thereof which the tractor-trailer needs to carry. Therefore, a large rectangular box shape is generally used for the trailer unit because such shape is most conducive to loading and unloading and carrying of cargo therein. However, it is also well-known that the rectangular box shape is extremely aerodynamically inefficient, and it is not only the forward flat front of the trailer which presents aerodynamic inefficiencies, but the rear of the trailer likewise is aerodynamically inefficient due to the large amount of turbulence and drag produced by air flowing over the top, bottom and sides of the trailer and onto the squared-off rear end. Particularly due to ever-increasing fuel prices, improvement of the aerodynamics of the tractor-trailer is becoming ever more important, and therefore there is a need to improve the aerodynamic performance of the tractor-trailer unit.

Many different inventions have been proposed in the prior art which attempt to address and solve this problem. For example, Roberge et al., in U.S. Pat. No. 6,485,087, disclose a panel configuration for attachment to the rear of a tractor-trailer which is designed to significantly reduce the turbulence and drag produced by the rear of the unadorned trailer. However, while Roberge et al. do provide one form of solution to the aerodynamic problem, their design raises other problems, namely, what happens when, inevitably, the panels encounter an external object such as a loading dock or another vehicle? As taught in the Roberge et al. patent, specifically in FIG. 9 thereof, a rubber flexible material may be applied to the leading edge of the panel to lessen the damage caused by the impact. Of course, such a rubber flexible edge will be of little use when the panel encounters a loading dock or the like, and it is clear that in such an instance the impact will cause a great deal of damage to the aerodynamic panel.

Many other devices have been proposed in the prior art which also incorporate aerodynamic panels on the rear of the tractor-trailer, but not a single one of these addresses the issue of what might occur when the panel impacts a loading dock or the like, as will inevitably occur when the tractor-trailer is being backed into a loading and unloading location. While some of the devices apparently teach the manual movement of the panels to a storage position prior to opening the rear doors and loading and/or unloading the trailer, this does not fully address the question of what might occur if the driver or loading dock personnel simply forget to move the panels to their storage position. Therefore, there is a significant need for an aerodynamic panel device which will not only function to significantly reduce the cost of operating the tractor-trailer, but which also addresses and solves the question of what might occur when the panels accidentally impact an external object such as a loading dock or the like.

Therefore, an object of the present invention is to provide an improved air drag reduction apparatus for tractor-trailers whereby damage to the aerodynamic panels caused by non-ballistic impact with external objects is significantly reduced and/or eliminated.

Another object of the present invention is to provide an improved air drag reduction apparatus for tractor-trailers which includes left, right and top panels, and for some applications bottom panels, which panels are mounted by hinges directly on the rear doors of the trailer, the panels and which extend rearwardly, when deployed, into an extended drag-reducing position at an inward angle of approximately five to twenty-five degrees relative to the planes defined by the top, bottom and sides of the tractor-trailer.

Another object of the present invention is to provide an improved air drag reduction apparatus for use with tractor-trailers which includes stop devices such as cables or hinge stops which hold the panels in an extended position to generally ensure that the proper angle of orientation is maintained during operation of the tractor-trailer.

Another object of the present invention is to provide such an improved air drag reduction apparatus for use with tractor-trailers that includes biasing devices which are associated with the panels, which are operative to bias the panels outwardly and rearwardly toward and into their extended positions, and which are further operative to permit each of the panels to pivot between the extended position towards and into a collapsed position when and if the panels come into contact with an external object. In accordance with the invention, the panels then are free to return to the extended position substantially immediately when such contact with an external object is discontinued. With such apparatus, damage to the left, right, top and bottom panels caused by impact with the external object may be significantly reduced or eliminated. As explained in further detail herein below, because of the novel arrangement provided by the invention, it is not always necessary to bias the side panels using directly attached biasing devices. Rather, in a preferred embodiment, the cooperative interaction between the panels causes the upwardly biased upper panels to apply an outwardly directed bias to the associated side panels.

Finally, an object of the present invention is to provide an improved air drag reduction apparatus for use with tractor-trailers which is relatively simple and durable in design and construction and is safe, efficient and effective in use.

SUMMARY OF THE INVENTION

The present invention provides an air drag reduction apparatus for use with vehicles having generally rectilinear top, side and base walls and a generally rectangular rear door. In a desirable form, the apparatus includes left, right and top, and sometimes bottom, generally trapezoidal panels, each of which has an inner edge and an outer edge. The apparatus further may desirably include a plurality of hinges mounted on the inner edges of each of the panels. Desirably, the hinges may be mounted directly on the rear doors of the vehicle such that the left, right, top and bottom panels may pivot thereon between their extended drag-reducing position and their collapsed position where they lie essentially against the rear door of the tractor-trailer. When the panels are in their extended drag-reducing position they extend generally rearwardly from the rear of the tractor-trailer at an inward angle of approximately five to twenty-five degrees relative to the respective planes formed by the top, side and base walls of the tractor-trailer.

Stop devices such as cables and/or hinge stops may be operatively associated with each of the panels for holding the panels in their extended drag-reducing position. Finally, a plurality of biasing devices such as springs and/or gas-driven pistons may be operatively associated with the left, right, top and bottom panels to bias the panels outwardly and rearwardly toward and into the extended position. These biasing devices are desirably designed and arranged so as to permit each of the panels to pivot, against the bias imposed by the biasing devices, from the extended position and towards and into the collapsed position upon the particular panel encounters and receives impact from an external object. The biasing devices are then operative to return the panels to their extended positions substantially immediately upon discontinuance of the contact with the external object. Accordingly, damage to the left, right, top and bottom panels from the external contact is significantly reduced or eliminated.

In a particularly preferred form of the invention, a cooperative wheel and ramp arrangement carried by a top panel and an associated side panel may be provided so that the upward movement of a top panel under the influence of a biasing device acts to cause a corresponding outward movement of the associated side panel. Moreover, an inward movement of the associated side panel caused by contact with an external structure, or otherwise, results in downward movement of the top panel under the influence of the wheel and ramp arrangement.

In another desirable form of the invention, a wheel may be provided at a lower outer corner of a side panel in a position such that direct contact between the panel and an external structure may be minimized and/or avoided. Such wheel may be utilized to cause the panels to collapse when an external pressure is applied thereto.

The present invention as thus described provides a significant advantage over other aerodynamic enhancing prior art devices. Specifically, the most significant problem encountered with aerodynamic panels mounted on tractor-trailer units is that the panels are prone to receive accidental non-ballistic impacts which damage the panels, due to the outwardly extending configuration of the panels, thus reducing their effectiveness and eventually requiring repair or replacement of the panels. This significantly increases the cost of operation in using the aerodynamic panels found in the prior art, which immediately and significantly brings into question the value of incorporating such aerodynamic panels, as the savings provided by incorporation of the panels is likely to be substantially offset by the cost of replacement and repair of the panels. None of the devices found in the prior art address or solve this problem as many of the prior art devices require active retraction or movement of the panels to prevent impact damage. Of course, it is the unintentional damage which presents the significant problem in connection with the known prior art, and it is the significant improvement of the present invention to provide a solution to this problem. It is therefore seen that the present invention provides a substantial improvement over those devices found in the prior art.

DETAILED DESCRIPTION OF THE PREFERRED EMBODIMENTS

Figure 1:
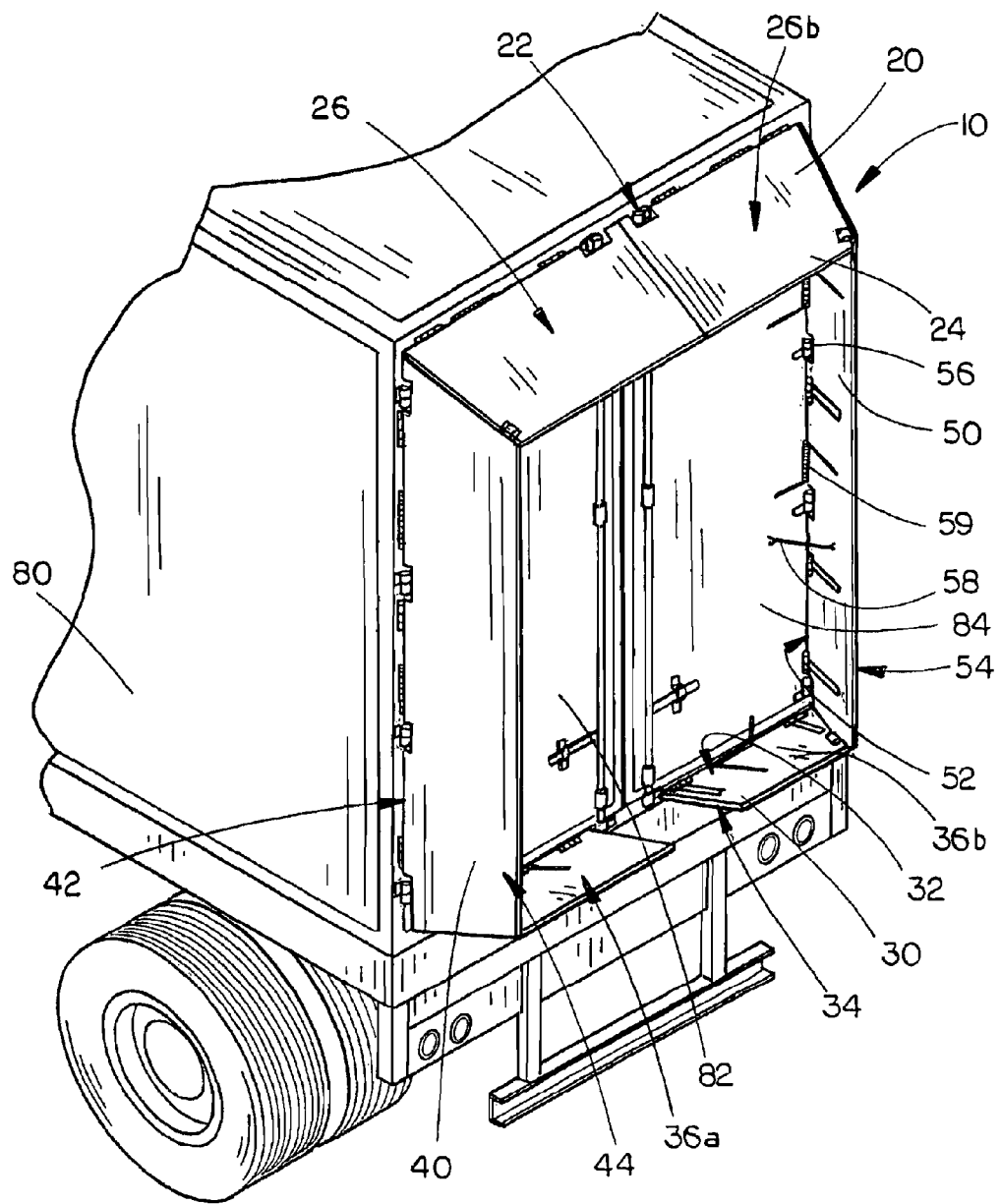
FIG. 1 is a perspective view of the air drag reduction apparatus of the present invention.

The air drag reduction apparatus 10 of the present invention is shown best in FIGS. 1-4 as including four aerodynamic panels, specifically a top panel 20, bottom panel 30, left side panel 40, and right side panel 50. It is preferred that each of the panels has the same generally trapezoidal shape, with the inner edges 22, 32, 42, 52 of the panels each having a greater length than the respective outer edges 24, 34, 44, 54 of the panels. In a preferred embodiment, each of the panels, 20, 30, 40, 50 may be constructed of a sturdy plastic or metal sheet material, although it has been found that the use of plastic material will significantly decrease the weight of the panels 20, 30, 40, 50 while simultaneously not sacrificing durability and effectiveness. Of course, however, the precise nature of the construction materials used in connection with the panels 20, 30, 40, 50 is not critical to the present invention so long as the aerodynamic enhancing features of the present invention are neither degraded nor destroyed.

Figure 4:
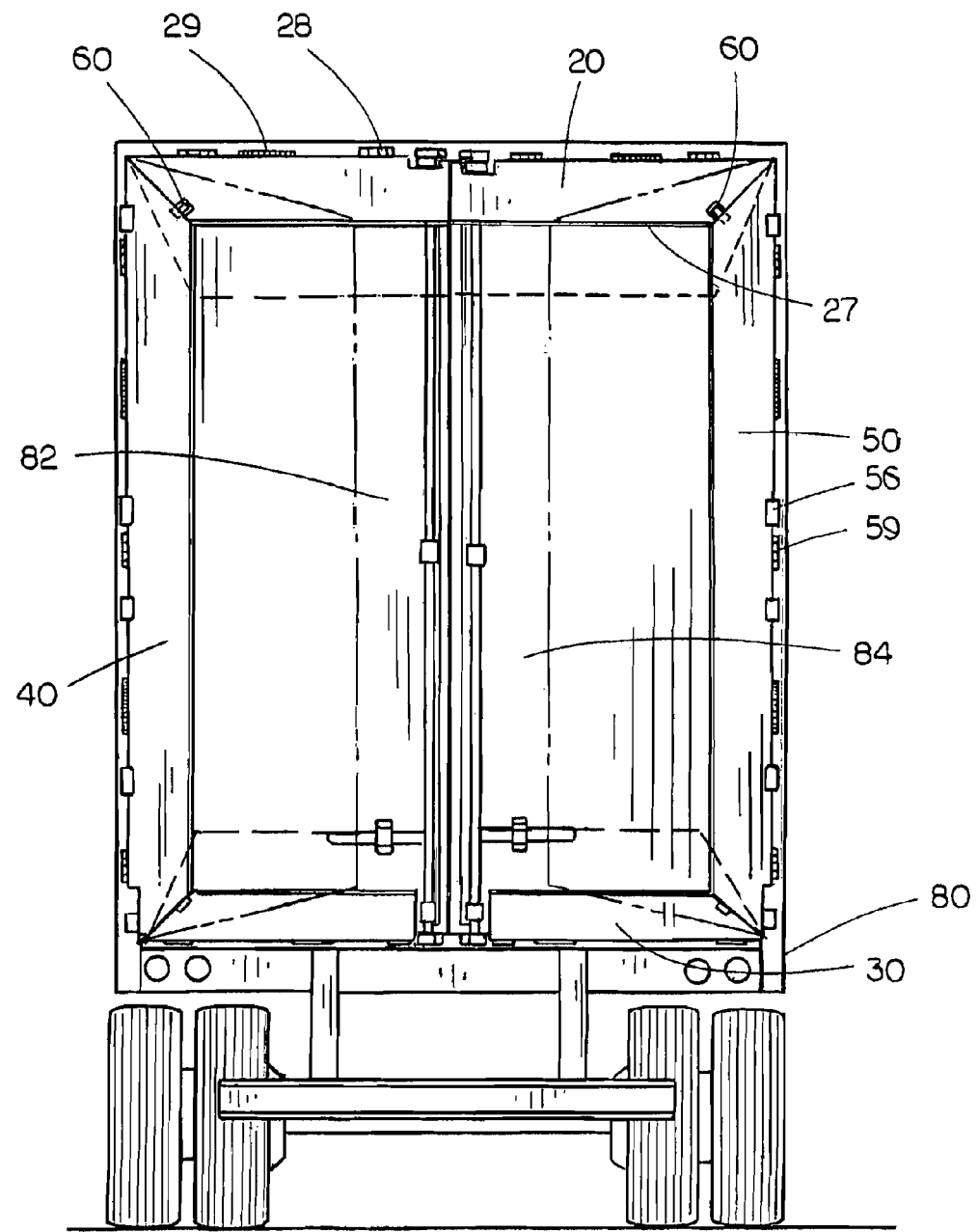
FIG. 4 is a rear elevational view of the present invention mounted on a trailer.
Figure 5:
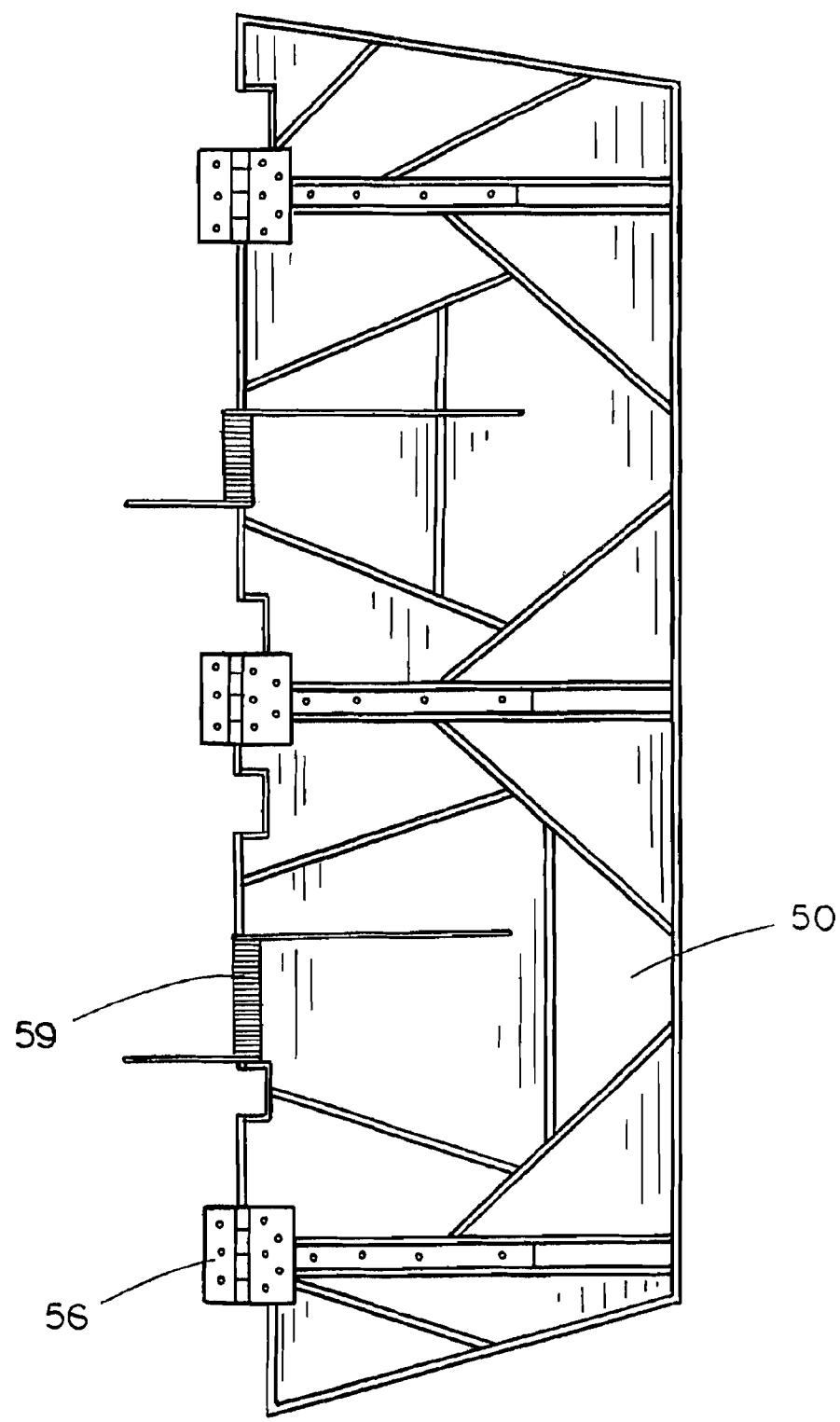
FIG. 5 is a side elevational view of a side panel of the present invention.
Figure 6:
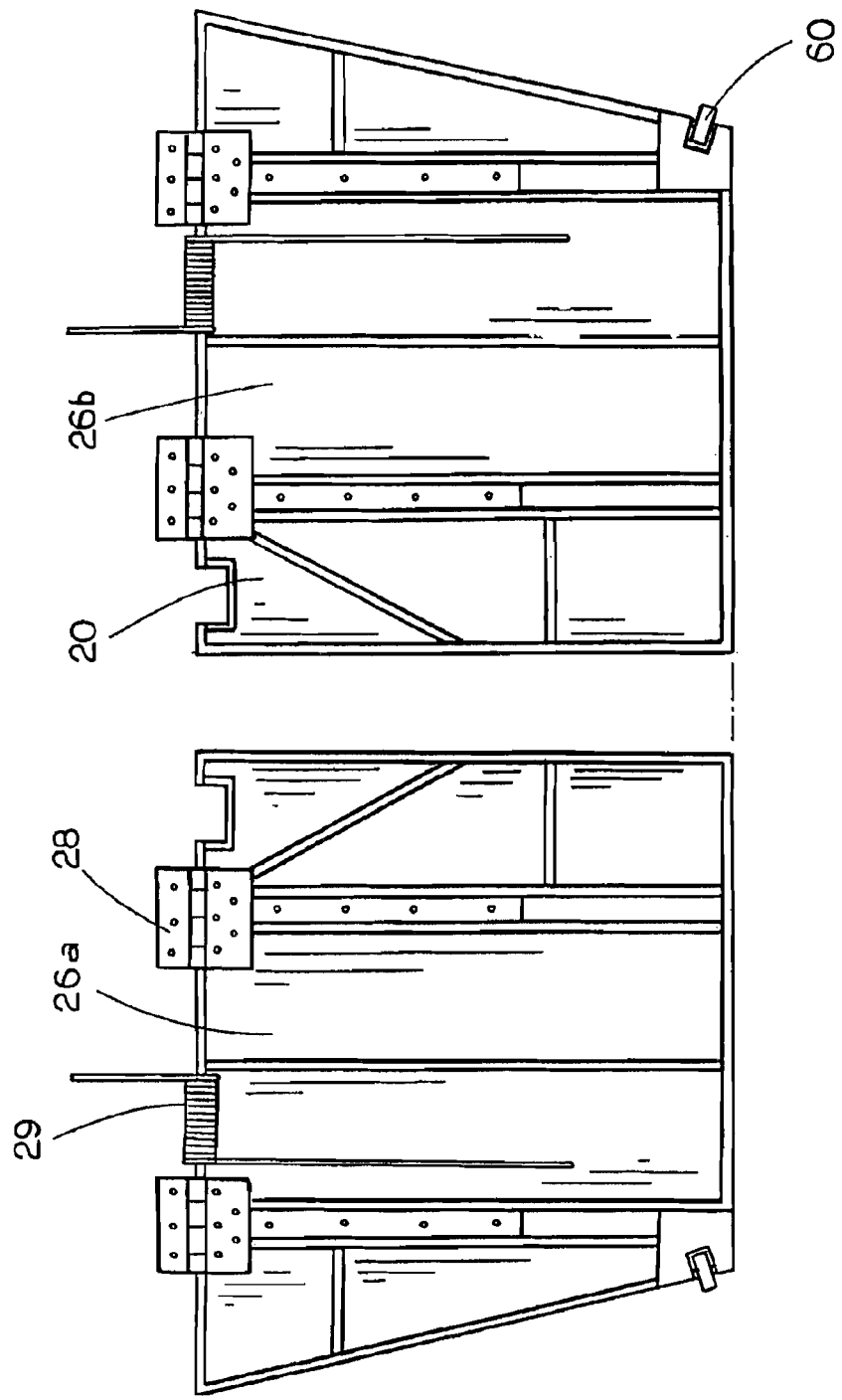
FIG. 6 is a top plan view showing the top panel of the invention.

In a preferred embodiment, the left and right side panels 40, 50 may generally be identical to one another, and likewise the top and bottom panels 20, 30 may also be generally identical to one another. Therefore, one of ordinary skill in the art would understand that the following description of right side panel 50 and top panel 20 applies equally to left side panel 40 and bottom panel 30 respectively. Right side panel 50 may preferably be mounted on the outer edge of right rear door 84 of tractor-trailer 80, as shown best in FIGS. 1 and 2. Specifically, right side panel 50 may be mounted on the right rear door 84 using a plurality of hinges 56 which connect the inner edge 52 of right side panel 50 to the right rear door 84. The precise size, shape, and number of hinges 56 used in connection with the mounting of right side panel 50 is not particularly critical to the present invention so long as the hinges 56 generally permit the right side panel 50 to pivot between an extended drag-reducing position, as shown in FIG. 1, where the aerodynamic improvement capabilities of the right side panel 50 are utilized, and a collapsed position where the panel lies essentially against the right rear door 84 as shown in FIG. 4.

In a preferred embodiment, the right side panel 50 desirably may be disposed so as to extend at an angle of approximately ten to fifteen degrees (10° to 15°) from parallel with the plane of the left side of the trailer 80, as it has been found that the range of five to twenty-five degrees (5° to 25°) provides the most significant increase in aerodynamic streamlining available via use of the air drag reduction apparatus 10 of the present invention. To secure the right side panel 50 in such extended position at the precise angle desired, a plurality of securement cables 58 may be connected to the right rear door 84 so as to extend outwardly to the right side panel 50 generally adjacent outer edge 54, as shown best in FIGS. 1 and 4. Alternatively, instead of securement cables 58, any appropriate securement devices, such as hinge stops (not shown), may be used in connection with the hinges 56 to prevent over rotation of the side panel 50 beyond the desired extended position.

Of course, the securement cables 58 only serve the purpose of preventing overrotation of the right side panel 50 beyond the desired extended position. It is therefore desirable, in some instances, to include biasing devices operatively associated with the right side panel 50 to bias the right side panel 50 outwardly and rearwardly until the securement cables 58 prevent further extension of the right side panel 50. There are several biasing mechanisms which may be used in connection with the present invention, i.e. tensioning springs, torsion bars or gas-filled cylinders, although in the preferred embodiment, the biasing devices may be a tensioning spring 59 mounted in or adjacent each of the hinges 56 for biasing the associated hinge 56 outwardly thereby pivoting right side panel 50 into its extended position, as shown best in FIGS. 1 and 2. Alternatively, a plurality of gas-filled cylinders may extend between and connect the right side panel 50 and right rear door 84 to provide a biasing effect to the right side panel 50 such that the right side panel 50 is biased into its extended position. The precise and specific nature of the biasing device is not critical to the present invention so long as the biasing devices bias the right side panel 50 outwardly into the extended position and further are operative to permit controlled collapsing of the right side panel 50 to its collapsed position in response to certain external stimuli which will be described herein. Moreover, in some instance, the panel 50 may be pushed outwardly by interaction between it and panel 20, as described later, and in such arrangement, biasing devices acting directly on panel 50 may not be needed.

Figure 2:
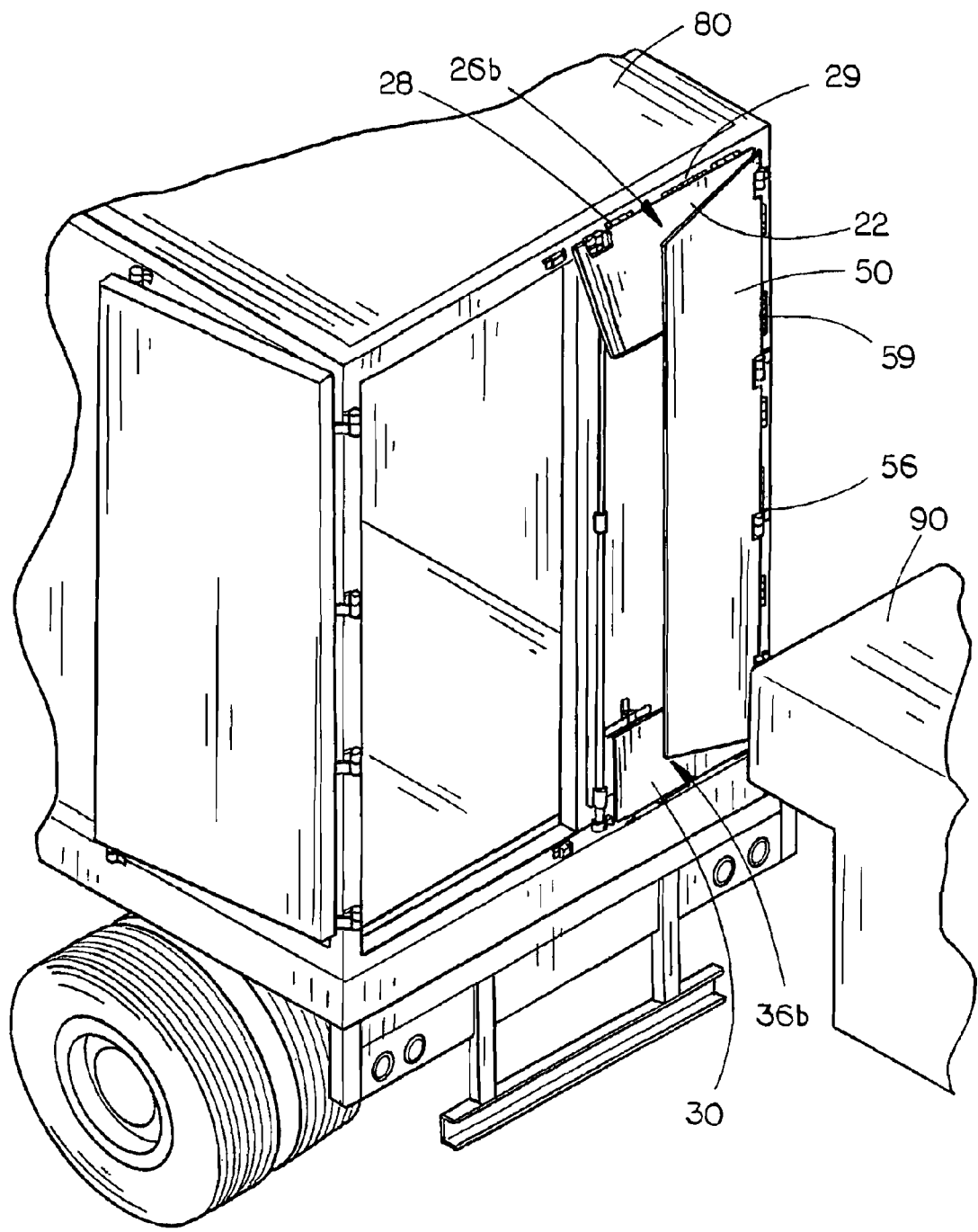
FIG. 2 is a perspective view of the invention during impact with a loading dock.
Figure 3:
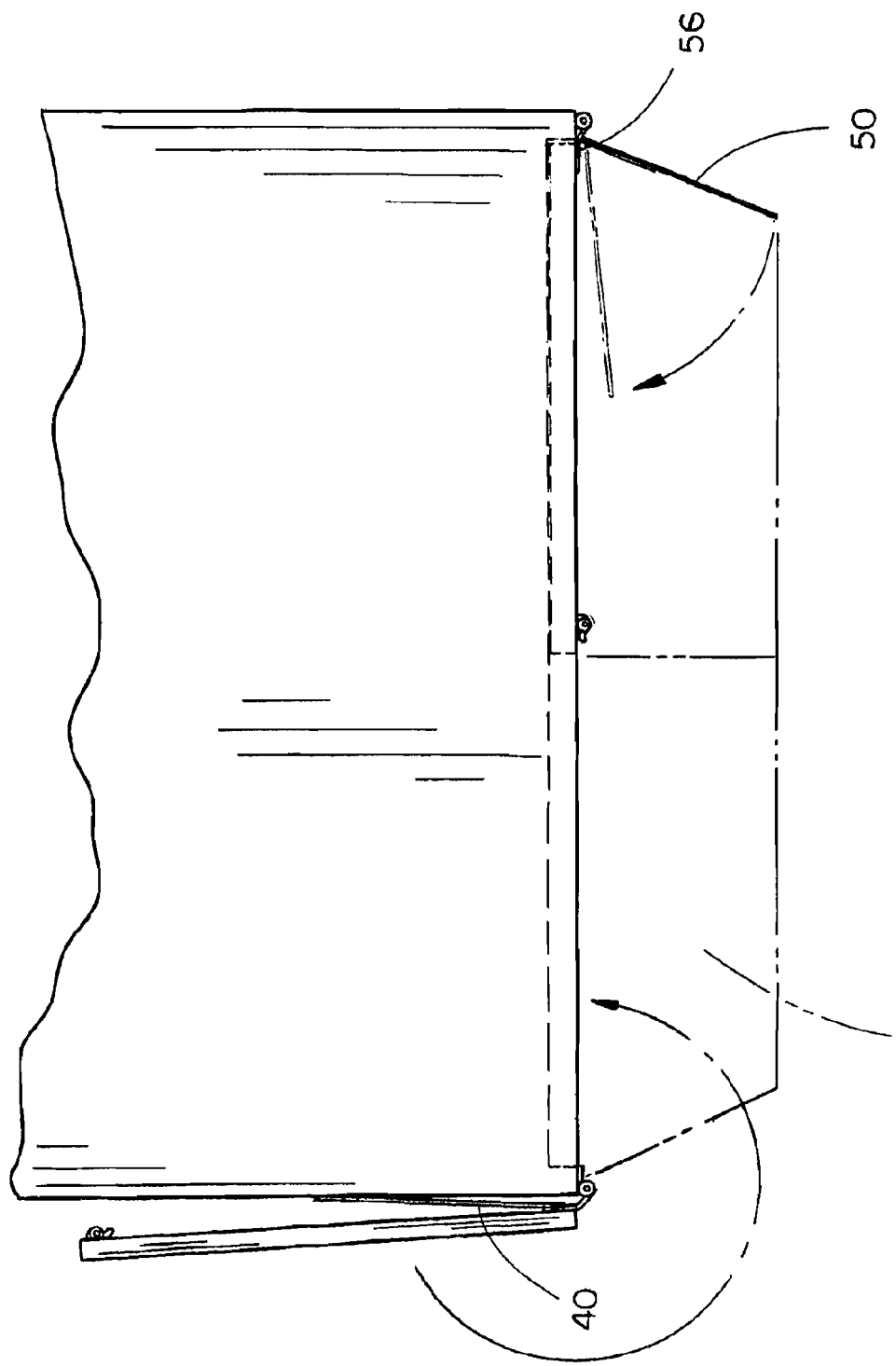
FIG. 3 is a top plan view showing how the panels are pivoted on the trailer.

Regarding top panel 20, it may be desirable to divide it into left and right top subpanels 26a, 26b, which, in the embodiment illustrated in FIGS. 1 and 2, are generally identical mirror images of one another and which are mounted to the top of the left and right rear doors 82, 84. Subpanels 26a, 26b may be mounted at the top of left and right rear doors 82, 84 respectively using a plurality of hinges 28 which function in the same manner as the hinges 56 described above in connection with right side panel 50. Furthermore, tensioning springs 29 may be mounted with hinges 28 to bias subpanels 26a, 26b upwardly and outwardly. Moreover, securement cables 27 may function in the same manner as securement cables 58 described above in connection with right side panel 50. As shown in FIGS. 1-4, it generally is preferred that top panel 20 extend across the entire width of the trailer 80. Also, the width of top panel 20 should desirably be approximately 34 inches, whereas the width of the right side panels 40, 50 should be approximately thirty-six inches. In this latter regard, and as would be understood by one of ordinary skill in the relevant art, the precise size and shape of the panels may be modified or changed to adjust the performance characteristics of the air drag reduction apparatus 10 of the present invention. The primary purpose, however, for the smaller width of the top and bottom panels 20, 30 relative to the left and right side panels 40, 50, is so that the upper and lower outer corners of the left and right side panels 40, 50 overlap the outer corners of the top and bottom panels 20, 30 such that when the left and right side panels 40, 50 are moved inwardly toward their collapsed position, sliding wheels 60 mounted at the corners of the top and bottom panels 20, 30 may be engaged by the left and right side panels 40, 50, whereby top and bottom panels 20, 30 collapse along with the left and right side panels 40, 50. This collapsing configuration is important for several reasons, but the most important of these will be described immediately hereafter.

The air drag reduction apparatus 10 of the present invention as described above incorporates many features found in the prior art. However, the significant and critical differences between the present invention and those inventions described in the prior art will now be described. Specifically, the biasing devices, namely the tensioning springs 29, 59, the hinges 28, 56 and the securement cables 27, 58, are designed to normally hold the top panel 20 and right side panel 50 in their extended positions. However, one of the problems frequently encountered in operation of a tractor-trailer is that the tractor-trailer must be backed into a loading dock or the like in order to load and/or unload the trailer 80. With the vast majority of air drag reduction devices found in the prior art, the devices must be manually retracted or shifted into their retracted position. With the present invention, however, when any of the top, bottom, left side or right side panels 20, 30, 40, 50 encounter an external object 90, such as a loading dock or the like, the tensioning springs 29 and 59 permit the impacted panel, specifically the right side panel 50 as shown in FIG. 2, to pivot about the hinges 56 against the bias of springs 28, 59 towards and into the collapsed position, where they are generally lie adjacent the right rear door 84, without significant damage being done to the right side panel 50. When the trailer 80 is moved forwardly out of contact with the loading dock 90, the tensioning springs 59 and hinges 56 act to re-extend the right side panel 50 to its extended position generally immediately after the contact with the external object, namely the loading dock 90, is discontinued. This feature the present invention virtually ensures that regardless of whether the operator of the tractor-trailer remembers to retract or extend the air drag reduction apparatus, such remembering is unnecessary, thus freeing the operator of at least one additional burden which will likely facilitate his or her improved operation of the tractor-trailer unit.

This damage reduction feature of the present invention becomes even more important when accidental non-ballistic impact with any external object is occurring, such as when the trailer is accidentally backed into a building or another vehicle, such as a fork lift or the like, accidentally comes into contact with the top, bottom, left side or right side panels 20, 30, 40, 50. In any event, the impacted panel will retract from the extended position and move toward its collapsed position until the contact with the external object is discontinued, at which time the impacted panel immediately returns to its extended position in preparation for continued functioning as an air drag reduction apparatus. No other device found in the prior art currently accomplishes this significant improvement, and therefore the damage reduction capabilities of the air drag reduction apparatus 10 of the present invention are deemed to be not only novel but vital to the functionality of the present invention.

An alternative embodiment of the air drag reduction apparatus 10' of the present invention is shown in FIGS. 7-11 as including top, left and right side panels 20', 40', 50' which include a significant improvement over the embodiment shown in FIGS. 1-4. Specifically, as seen best in FIGS. 7, 9 and 11, the top, left and right side panels 20', 40', 50' each include an arcuate convexly curved outer wall 222, 242, 252 which changes the airflow over the top, left and right side panels 20', 40', 50' from the straight line flow of the first embodiment to an airflow more similar to that encountered with aircraft wings and airfoils. The important result of this significant modification is that the air passing over and flowing off of the top, left and right side panels 20', 40', 50' forms a less turbulent wake at the outer edges 24', 44', 54' of the top, left and right side panels 20', 40', 50' than that encountered during use of the embodiments of FIGS. 1-4, and in fact this results in significant improvement in the fuel consumption savings afforded by the use of the present invention.

Figure 7:
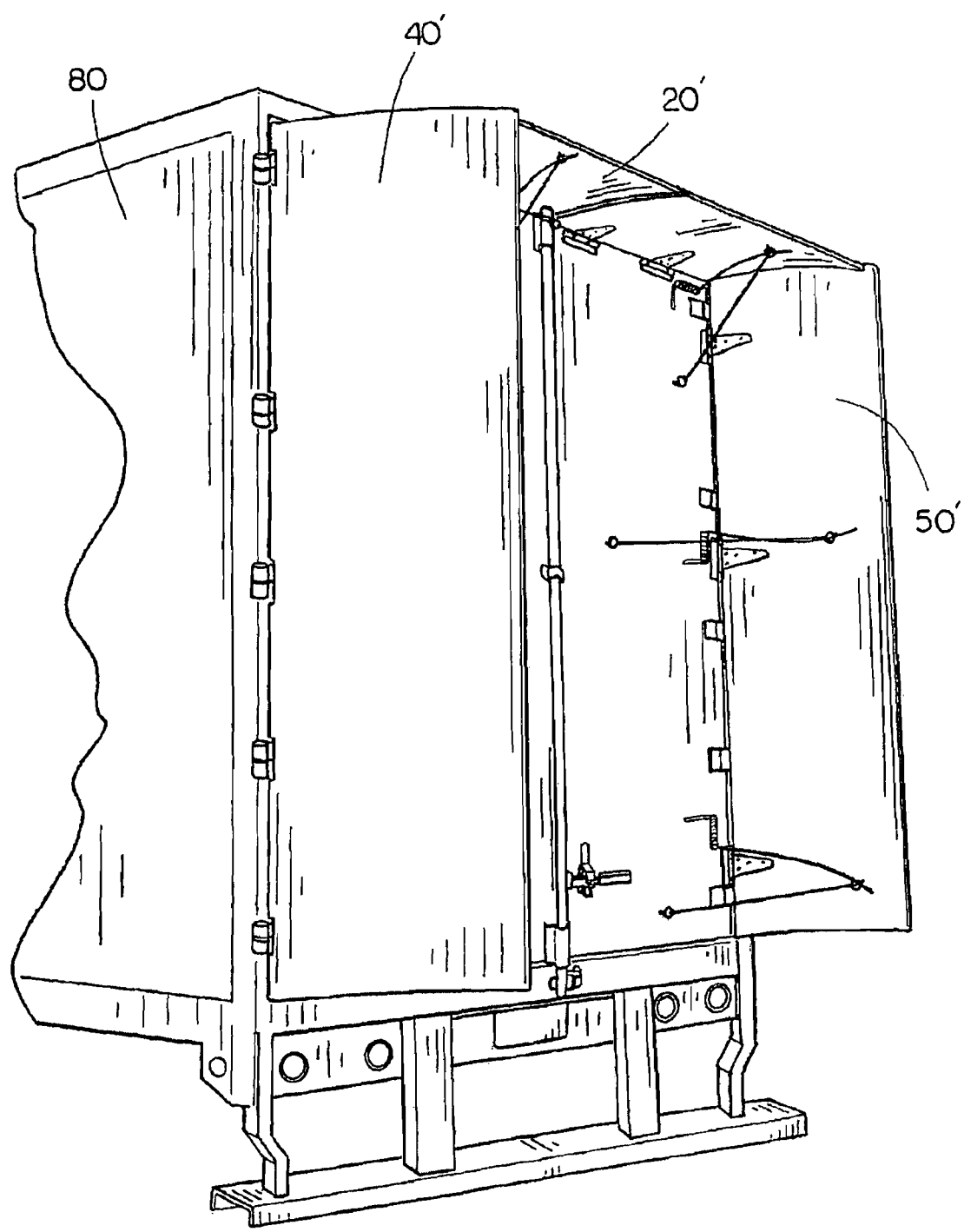
FIG. 7 is a perspective view of an alternative embodiment of the air drag reduction apparatus of the present invention.
Figure 8:
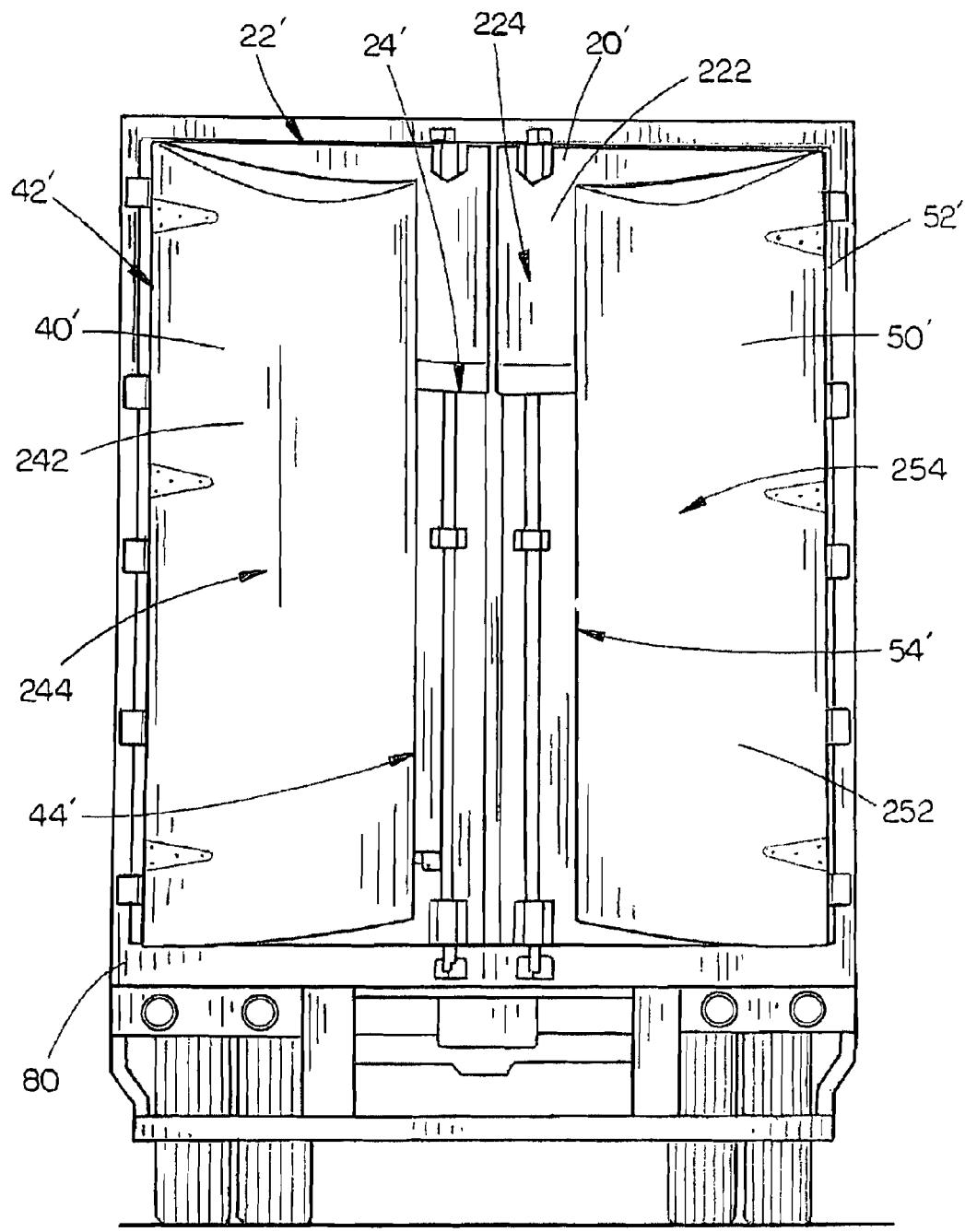
FIG. 8 is a rear elevational view of the embodiment of FIG. 7 mounted on a trailer.
Figure 9:
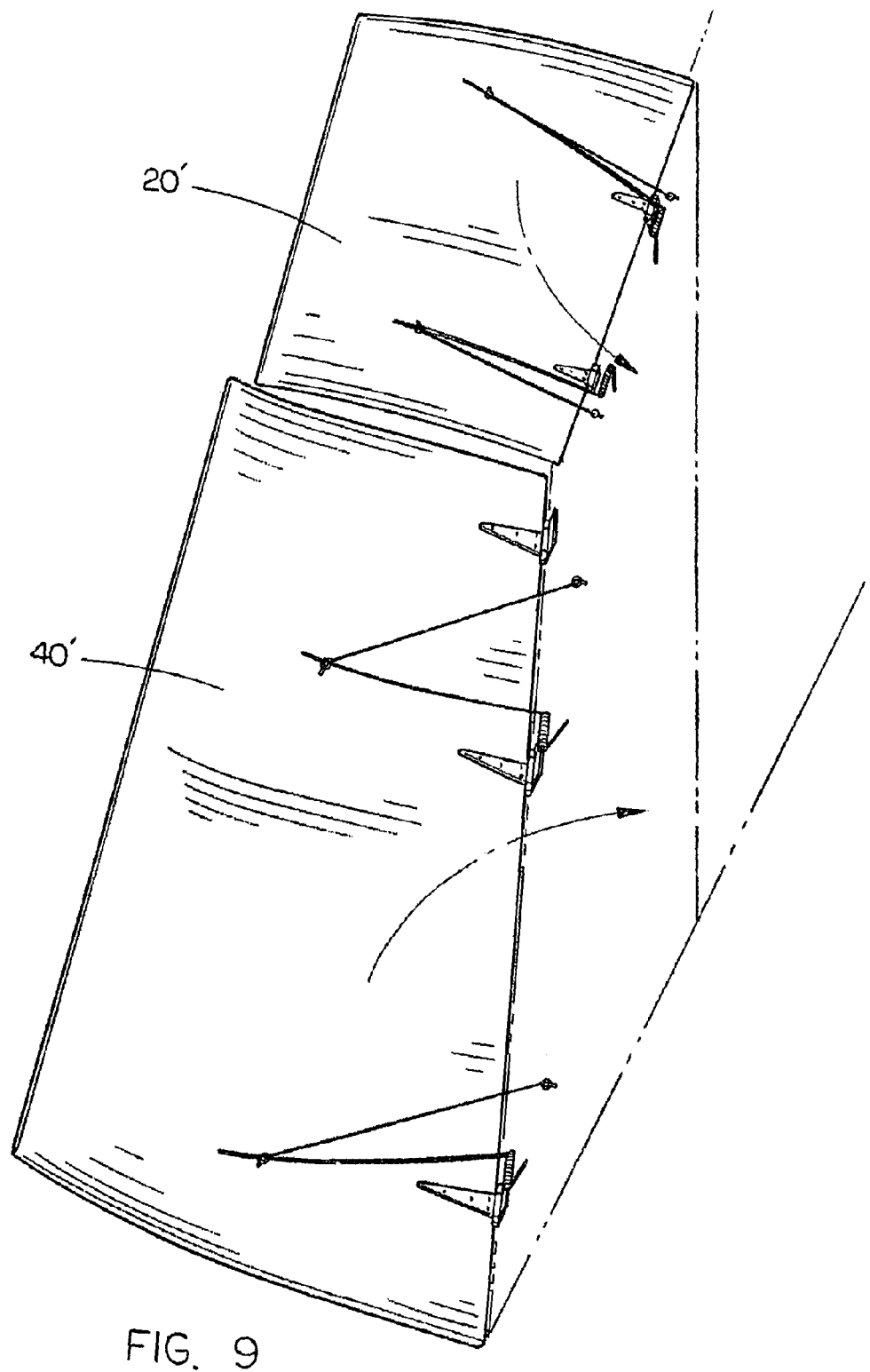
FIG. 9 is a detailed perspective view of the embodiment of FIG. 7 folding down to the collapsed position.

In a preferred embodiment, the top, left and right side panels 20', 40', 50' each may include the arcuate outer walls 222, 242, 252 as described above and as shown in FIGS. 7-11, and the curvature of the arcuate portions 224, 244, 254 of the arcuate outer walls 222, 242, 252 may be modified for use with particular models of trailers 80. It is preferred, however, that the convex curvature of the arcuate portions 224, 244, 254 of arcuate outer walls 222, 242, 252 be approximately ten to forty degrees (10° to 40°) of arc, with a radius of approximately two to ten feet, depending on the size and shape of the top, left and right side panels 20', 40', 50'. Of course, it should be noted that particular convex curvature dimensions of the top, left and right side panels 20', 40', 50' are not necessarily critical to the proper operation of the present invention, so long as the outer edges 24', 44', 54' of each of the panels are positioned downwards and/or inwards from the inner edges 22', 42', 52' of each of the panels, as shown in FIGS. 7, 9 and 11, to enable to turbulence-reducing feature of the top, left and right side panels 20', 40', 50'.

Figure 10:
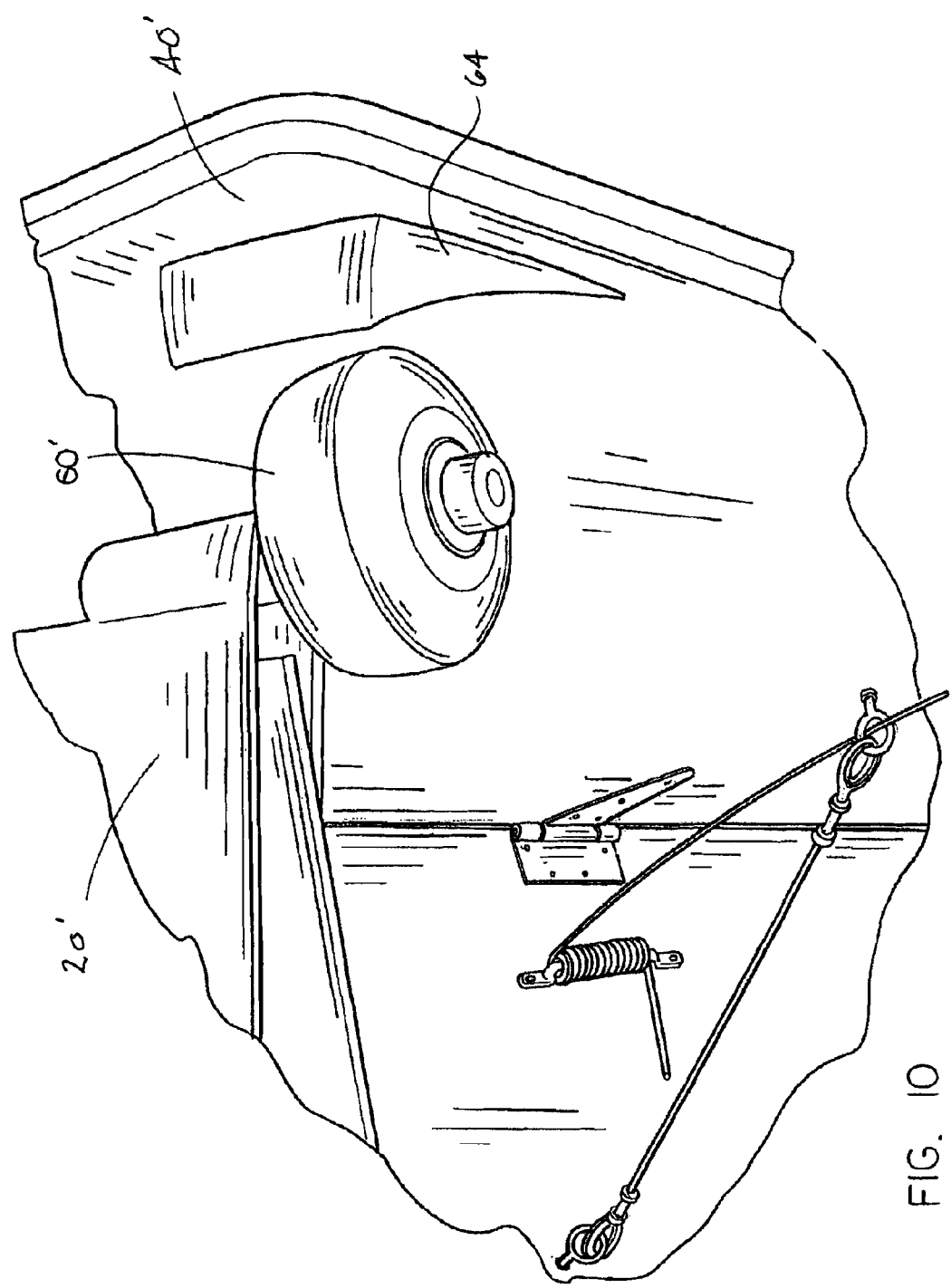
FIG. 10 is a detailed perspective view of the embodiment of FIG. 7 schematically showing a roller wheel and ramp arrangement which facilitates the collapsing of the panels.
Figure 11:
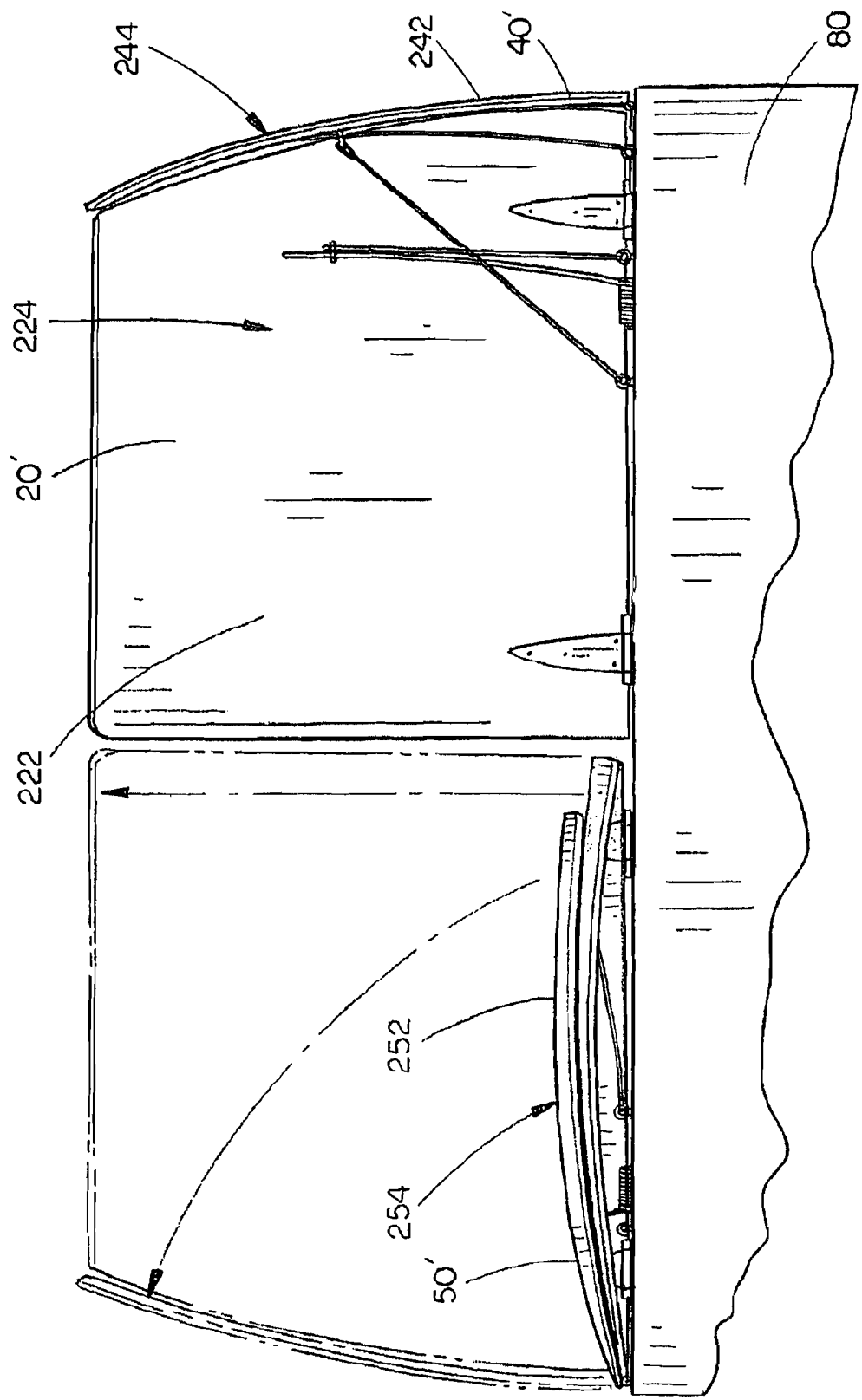
FIG. 11 is a top plan view of the embodiment of FIG. 7 showing the curvature of the panels and the extended and collapsed positions thereof.

FIG. 10 illustrates an additional feature of the present invention, namely the improved camming wheels 60' mounted at either side of the top panel 20' which are engaged by the left and right side panels 40' and 50' so that the top panel 20' may be collapsed along with the left and/or right side panels 40', 50' when the latter are moved to their collapsed positions shown in FIG. 11. Wheels 60' may desirably be used in conjunction with a ramp 62 as explained herein below with reference to FIGS. 12, 13, 14, 16 and 17.

Finally, it should also be noted that manner by which the top, left and right side panels 20', 40', 50' are mounted on the trailer 80 and the hinges, tensioning springs and cables used in connection with the mounting and collapsing functionality of the top, left and right side panels 20', 40', 50' are generally identical to those described in connection with the embodiment of FIGS. 1-4, and therefore further discussion of those features in connection with the embodiment of FIGS. 7-11 is deemed unnecessary. However, due to the curvature of the top, left and right side panels 20', 40', 50', some modifications to the mounting of those panels on the trailer 80 may be found to be necessary, and such modifications would be understood by one skilled in the art of mounting after-market accessories on vehicles.

It is to be understood that numerous additions, modifications and substitutions may be made to the air drag reduction apparatus 10 of the present invention which fall within the intended broad scope of the appended claims. For example, the precise size, shape and construction materials used in connection with the top, bottom, left side and right side panels 20, 30, 40, 50 and the top, left and right side panels 20', 40', 50' of FIGS. 7-11 may be modified or changed so long as the intended functionality of the panels is maintained. Also, although the biasing devices have been described as being either tensioning springs or gas cylinders, other types of biasing devices may be used in connection with the present invention, so long as the function of holding the panels in their extended positions absent contact with an external object which will force the contacted panel towards and into its collapsed position generally adjacent the associated left or right rear door 82 and 84 is maintained. Furthermore, it should be noted that the top and bottom panels 20, 30, specifically top subpanels 26a, 26b and bottom subpanels 36a, 36b, function generally independently of each other, as the division between the sub panels 26a, 26b, 36a, 36b must be maintained to permit the left and right rear doors 82, 84 to properly open and close to provide access to the interior of the trailer 80. Also, regarding bottom subpanels 36a, 36b, it is preferred that they be spaced apart from one another in order to provide easy access to the locking handles of the left and right rear doors 82, 84, as shown in FIGS. 1, 2 and 4, and this gap may be of any appropriate distance to perform this function. Finally, it should be noted that it is a critical feature of the present invention that the panels be mounted directly on the left and right rear doors 82, 84 so that the panels will travel with the left and right rear doors 82, 84 when the doors are being opened and closed. This will ensure proper functioning of the top, bottom, left side and right side panels 20, 30, 40, 50 regardless of the precise size and configuration of the left and right rear doors 82, 84.

Figure 12:
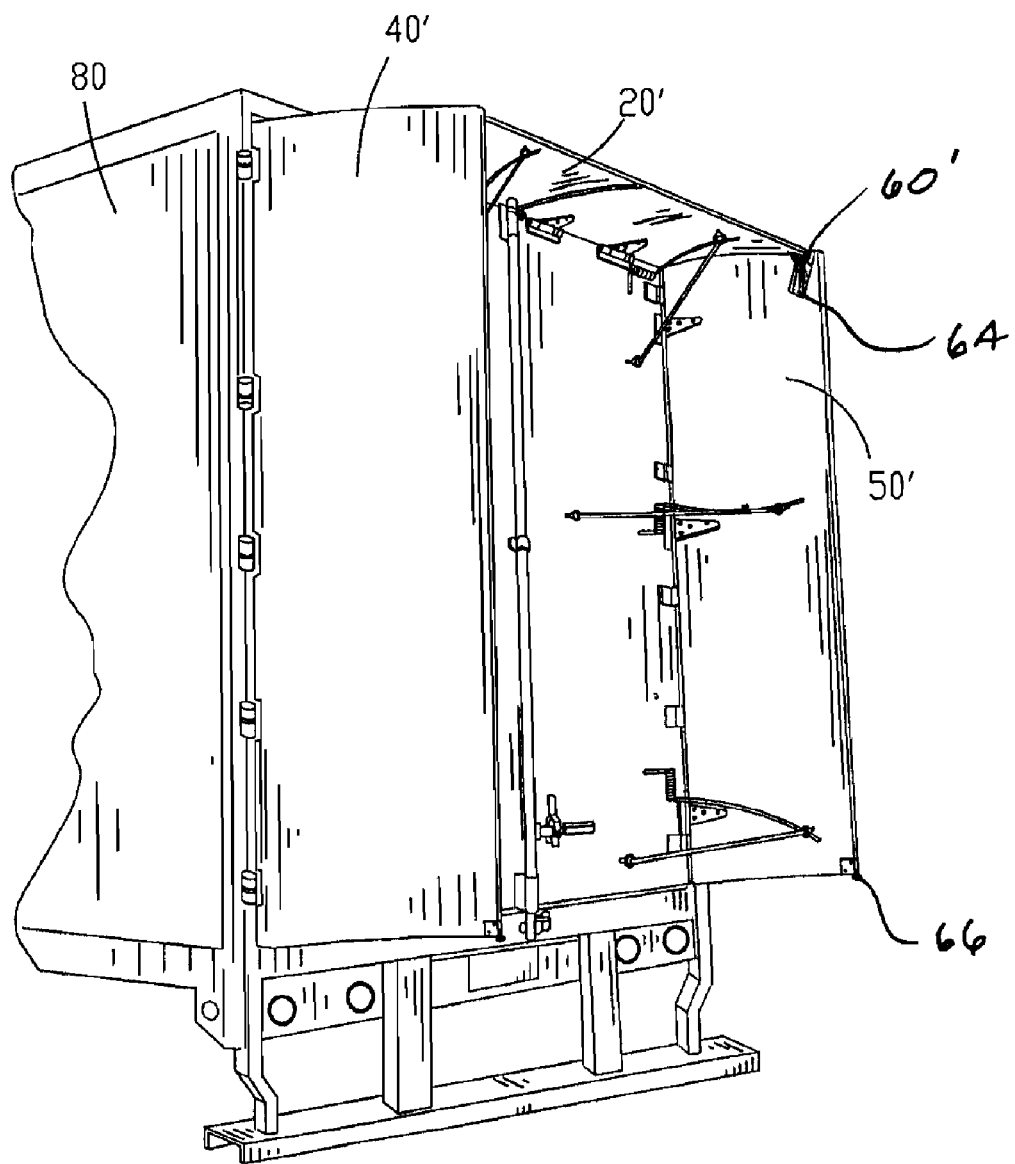
FIG. 12 is a perspective view similar to FIG. 7 showing another alternative form of the air drag reduction apparatus of the present invention which includes a cooperative wheel and ramp arrangement and a bottom impact wheel.
Figure 13:
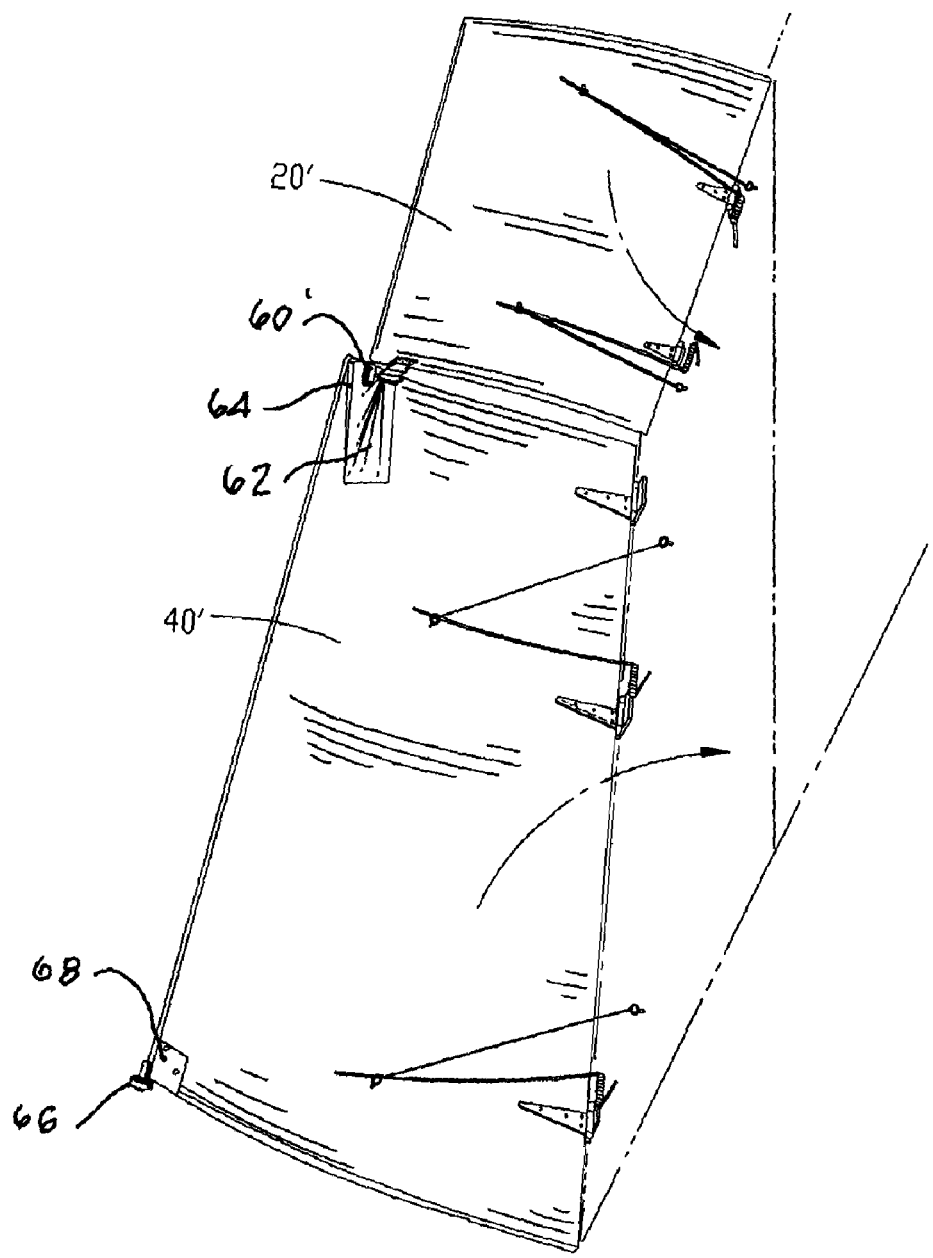
FIG. 13 is a detailed perspective view of the embodiment of FIG. 12 folding down to the collapsed position.
Figure 14:
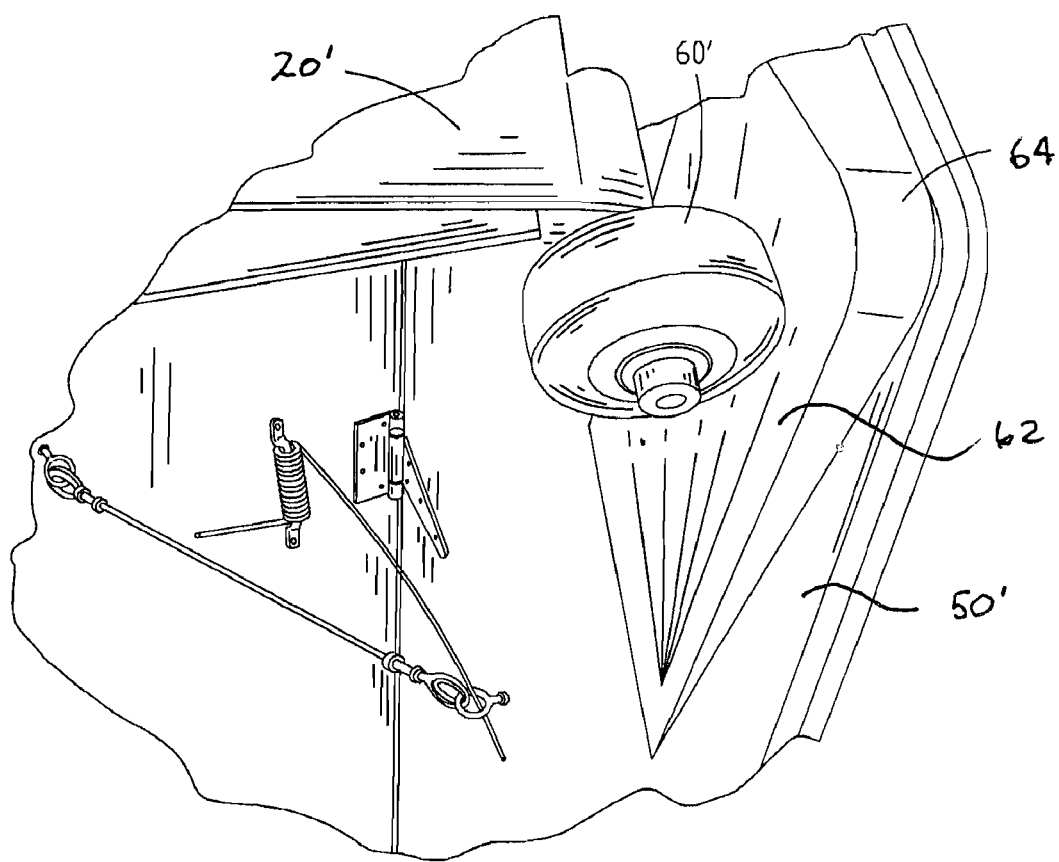
FIG. 14 is a detailed perspective view of the embodiment of FIG. 12 showing the cooperative wheel and ramp arrangement which allows the panels to fold down as a single unit.
Figure 16:
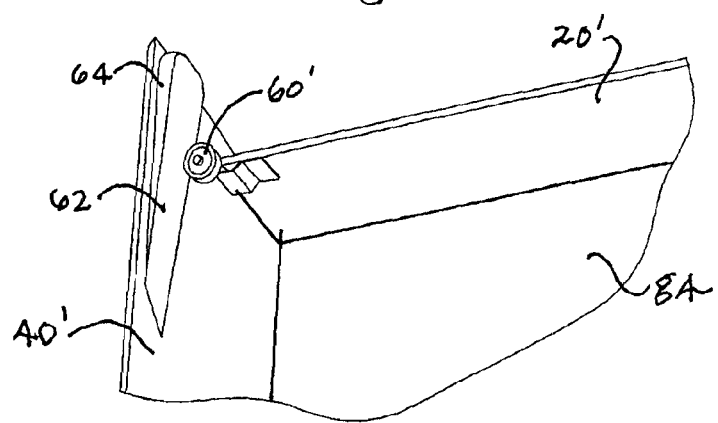
FIG. 16 is an enlarged detailed perspective view showing the cooperative wheel and ramp arrangement of FIG. 12.
Figure 17:
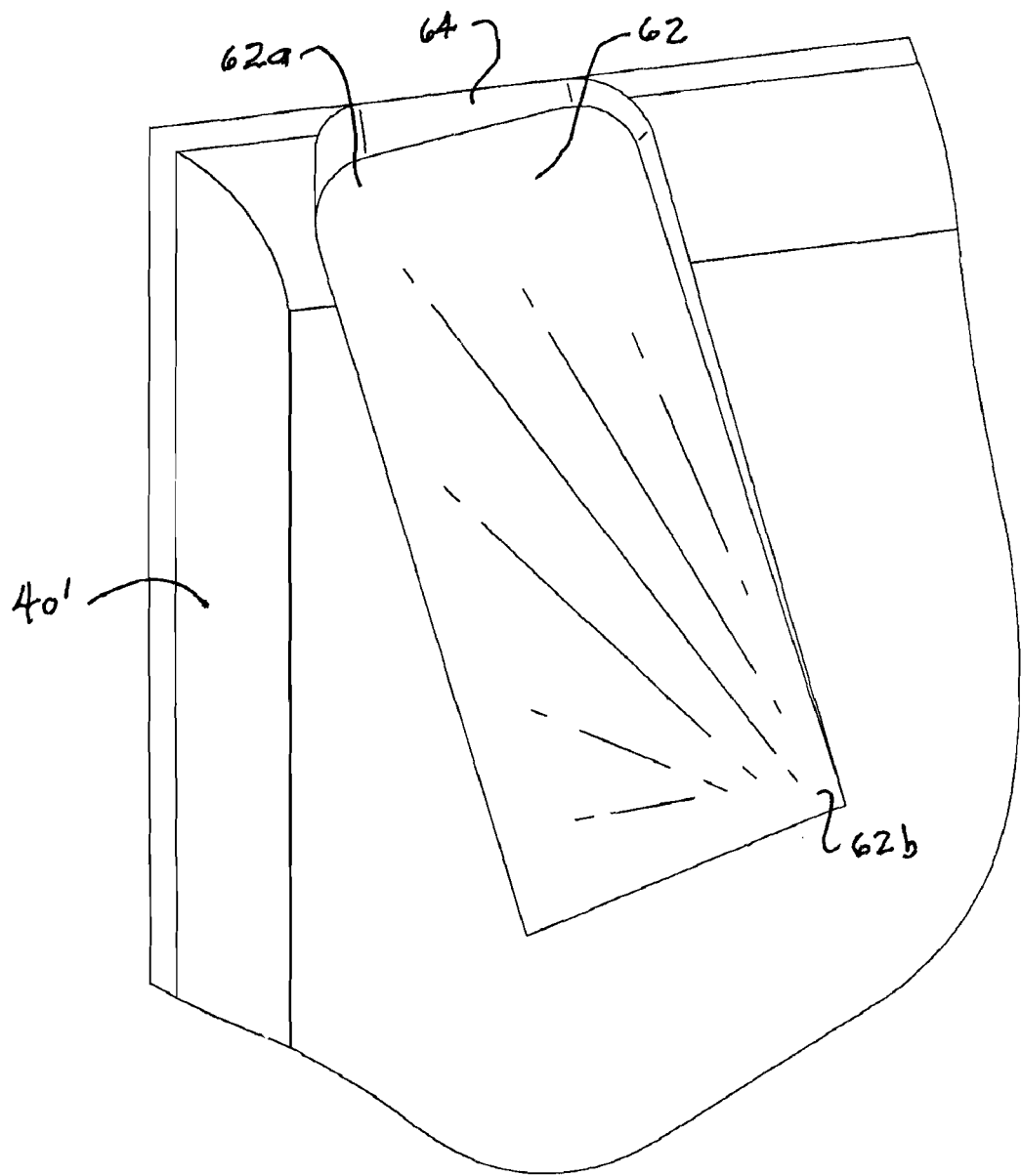
FIG. 17 is an enlarged detailed perspective view showing the ramp of FIG. 16.

Turning now to the ramp and wheel arrangement illustrated in FIGS. 12, 13, 14, 16 and 17, a force transferring element in the form of cam following wheel 60' rides across a camming surface 62 of another force transferring element in the nature of ramp 64, so that when panel 50' (or 40') is moved toward its collapsed condition illustrated in FIG. 11, the respective camming surface 62 pushes on wheel 60' and imposes a camming force on the latter to move it in a downward and inward direction. These elements 60' and 64 are interengageable and cooperable for causing the top panel to pivot toward its collapsed position in response to pivoting of the side panel toward its collapsed position. Since wheel 60' is carried by panel 20', this camming of the wheel 60' under the influence of the surface 62 causes the panel 20' also to move downwardly and inwardly toward its collapsed condition illustrated in FIG. 11. Conversely, when panel 20' moves toward its open position illustrated in FIG. 12, the interaction between wheel 60' and surface 62 is reversed such that wheel 60' pushes against surface 62 to force panel 40' or 50' toward its open position, again as illustrated in FIG. 12. As shown in FIG. 12, panel 50' is equipped with tensioning devices 59'. However, as a result of the interaction between surface 62 and wheel 60', the tensioning devices 59' may be eliminated because the tensioning devices 29' operate to push panel 20' upwardly and outwardly whereby the wheel 60' pushes the surface 62 and thereby the panels 40', 50' outwardly. A desirable positioning of ramp 64 relative to wheel 60' is illustrated in FIGS. 13, 14 and 16 and a preferred positioning of ramp 64 relative to panel 40' is illustrated in FIGS. 13 and 17. And with reference to FIGS. 13 and 17, it can be seen that surface 62 desirably slopes toward the inside surface of panel 40' from its upper left hand corner 62a and toward its lower right hand corner 62b. Of course the exact slope of the surface 62 may vary from application to application. However, one of ordinary skill in the pertinent art should have no difficulty in determining the slope for a given application either by mathematics or by trial and error. The main consideration being simply to prevent jamming of the arrangement as the wheel 60' pushes against the ramp 64 and vice versa.

Figure 15:
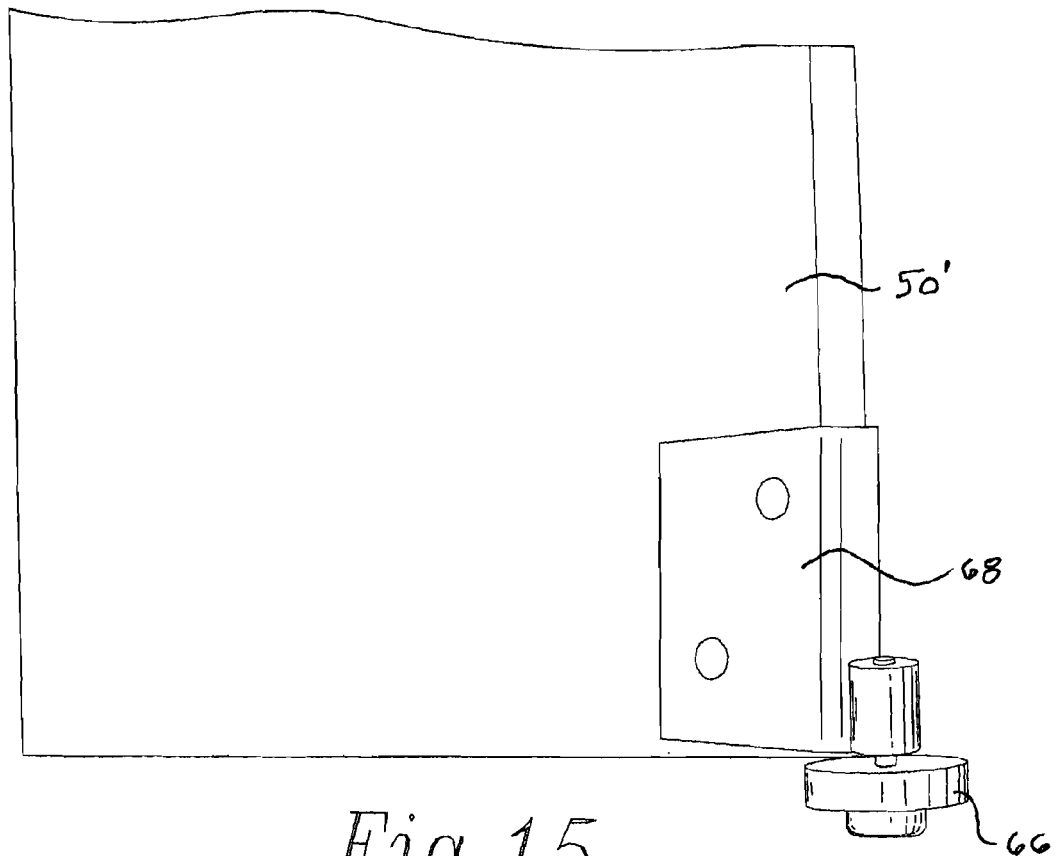
FIG. 15 is an enlarged detailed perspective view showing the bottom wheel of FIG. 12.

Another important feature of the invention is illustrated in FIGS. 12, 13 and 15. This feature comprises a panel protection member in the form of wheel 66 projecting from the lower corner on the outer edge of each of the panels 40', 50' in a position for being contacted by external objects during movement of the vehicle to thereby cause the panels to move toward their respective collapsed positions. Thus, direct contact between external objects and the panels may be prevented or at least minimized. The wheel 66 may be mounted on its respective panel 40', 50' using conventional mounting hardware 68 as illustrated particularly in FIGS. 13 and 15.

There has therefore been shown and described an air drag reduction apparatus 10 which accomplishes at least all of its intended objectives.

I claim:

1. An air drag reduction apparatus for use with vehicles having a generally rectangular rear door, said apparatus comprising:
   a side panel having an inner edge and an outer edge, said outer edge of the side panel having an upper corner;
   a top panel having an inner edge and an outer edge, said outer edge of the top panel having a laterally disposed outer corner;
   respective hinge assemblies mounted on the panels adjacent the inner edges thereof, said assemblies being configured and arranged for pivotally mounting said panels on the rear door of the vehicle and operative to permit each of said panels to pivot between an extended drag-reducing position where the panel extends generally rearwardly from the rear door and a collapsed position where the panel is located adjacent the rear door, said panels being located relative to one another such that the upper corner of the side panel and the outer corner of the top panel corner are in proximity with one another when the panels are in their respective extended drag-reducing positions; and
   a respective force transferring element mounted at each of said corners, said elements being interengageable and cooperable for causing the top panel to pivot toward its collapsed position in response to pivoting of the side panel toward its collapsed position, one of said elements comprising a cam surface and the other of said elements comprising a cam follower,
   wherein one of said elements comprises a ramp presenting said surface and the other element comprises a wheel which engages and rides on said surface.

2. The air drag reduction apparatus of claim 1 wherein said elements are interengageable and cooperable for causing the side panel to pivot toward its extended drag-reducing position in response to pivoting of the top panel toward its extended drag-reducing position.

3. The air drag reduction apparatus of claim 1 wherein is included a respective stop member operative to prevent the respective panels from pivoting beyond their respective extended drag-reducing positions.

4. The air drag reduction apparatus of claim 3 wherein said stop member comprises a securement cable extending between the panel and a surface of the vehicle.

5. The air drag reduction apparatus of claim 1 wherein is included a yieldable panel biasing mechanism operatively associated with said top panel, said biasing mechanism being operative to bias the top panel outwardly and upwardly toward its extended drag-reducing position and to yield sufficiently to permit the top panel to pivot from its extended position and toward its collapsed position when the panel is subjected to forces imposed by an external object.

6. The air drag reduction apparatus of claim 5 wherein is included a stop member operative to prevent the panel from pivoting beyond its extended drag-reducing position.

7. The air drag reduction apparatus of claim 5 wherein said yieldable panel biasing mechanism comprises a tensioning spring, a torsion bar or a gas-filled cylinder.

8. The air drag reduction apparatus of claim 1 wherein said side panel is generally trapezoidal in shape and has an airfoil cross-sectional shape, and when said side panel is in its extended drag-reducing position it extends at an angle of between five to twenty-five degrees from parallelism relative to the plane of an adjacent one of the side walls of said tractor-trailer.

9. An improved tractor-trailer vehicle having a generally rectangular rear door and an air drag reduction apparatus as set forth in claim 8.

10. The air drag reduction apparatus of claim 1 wherein said top panel is generally trapezoidal in shape and has an airfoil cross-sectional shape, and when said top panel is in its extended drag-reducing position it extends at an angle of between five to twenty-five degrees from parallelism relative to the plane of the top wall of said tractor-trailer.

11. An improved tractor-trailer vehicle having a generally rectangular rear door and an air drag reduction apparatus as set forth in claim 10.

12. The air drag reduction apparatus of claim 1 further including an outwardly extending panel protection member projecting from the lower corner of the panel in a position for being contacted by external objects during movement of the vehicle to thereby prevent direct contact between an external object and the panel and cause the panel to move toward its collapsed position.

13. The air drag reduction apparatus of claim 12 wherein said panel protection member comprises a wheel rotatable about an upright axis.

14. An air drag reduction apparatus for use with vehicles having a generally rectangular rear door, said apparatus comprising:
- a side panel having an inner edge and an outer edge, said outer edge of the side panel having a lower corner;
- a hinge assembly mounted on said panel adjacent the inner edge thereof, said assembly being configured and arranged for pivotally mounting said panel on the rear door of the vehicle and operative to permit said panel to pivot about an upright axis between an extended drag-reducing position where the panel extends generally rearwardly from the rear door and a collapsed position where the panel is located adjacent the rear door; and
- an outwardly extending panel protection member projecting from the lower corner of the panel in a position for being contacted by external objects during movement of the vehicle to thereby prevent direct contact between an external object and the panel and cause the panel to move toward its collapsed position.

15. The air drag reduction apparatus of claim 14 wherein said panel protection member comprises a wheel.

16. An air drag reduction apparatus for use with vehicles having a generally rectangular rear door, said apparatus comprising:
- a side panel having an inner edge and an outer edge, said outer edge of the side panel having upper and a lower corners;
- a top panel having an inner edge and an outer edge, said outer edge of the top panel having a laterally disposed outer corner;
- respective hinge assemblies mounted on the panels adjacent the inner edges thereof, said assemblies being configured and arranged for pivotally mounting said panels on the rear door of the vehicle and operative to permit each of said panels to pivot between an extended drag-reducing position where the panel extends generally rearwardly from the rear door and a collapsed position where the panel is located adjacent the rear door, said panels being located relative to one another such that the upper corner of the side panel and the outer corner of the top panel corner are in proximity with one another when the panels are in their respective extended drag-reducing positions;
- a respective force transferring element mounted at each of said corners, said elements being interengageable and cooperable for causing the top panel to pivot toward its collapsed position in response to pivoting of the side panel toward its collapsed position, one of said elements comprising a cam surface and the other of said elements comprising a cam follower; and
- an outwardly extending panel protection member projecting from the lower corner of the panel in a position for being contacted by external objects during movement of the vehicle to thereby prevent direct contact between an external object and the panel and cause the panel to move toward its collapsed position.

17. The air drag reduction apparatus of claim 16 wherein said panel protection member comprises a wheel rotatable about an upright axis.

18. The air drag reduction apparatus of claim 16 wherein said elements are interengageable and cooperable for causing the side panel to pivot toward its extended drag-reducing position in response to pivoting of the top panel toward its extended drag-reducing position.

* * * * *